United States Patent
Hosseini et al.

(10) Patent No.: US 10,951,363 B2
(45) Date of Patent: Mar. 16, 2021

(54) HYBRID AUTOMATIC REPEAT REQUEST FEEDBACK IN A PHYSICAL UPLINK CHANNEL

(71) Applicant: QUALCOMM Incorporated, San Diego, CA (US)

(72) Inventors: Seyedkianoush Hosseini, San Diego, CA (US); Wanshi Chen, San Diego, CA (US); Amir Farajidana, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 39 days.

(21) Appl. No.: 16/370,040

(22) Filed: Mar. 29, 2019

(65) Prior Publication Data

US 2019/0305894 A1 Oct. 3, 2019

Related U.S. Application Data

(60) Provisional application No. 62/651,627, filed on Apr. 2, 2018.

(51) Int. Cl.
*H04L 1/18* (2006.01)
*H04W 72/12* (2009.01)
(Continued)

(52) U.S. Cl.
CPC .......... *H04L 1/1819* (2013.01); *H04L 1/1621* (2013.01); *H04L 1/1685* (2013.01);
(Continued)

(58) Field of Classification Search
CPC .................................................. H04L 1/1819
See application file for complete search history.

(56) References Cited

U.S. PATENT DOCUMENTS

2011/0239076 A1* 9/2011 Liu ................... H04W 52/0241
714/751
2013/0272281 A1* 10/2013 Xu ......................... H04L 1/1896
370/336

(Continued)

OTHER PUBLICATIONS

Huawei, et al., "HARQ Timing, Multiplexing, Bundling, Processing Time and Number of Processes", 3GPP TSG RAN WG1 Meeting #90bis, 3GPP Draft; R1-1717075, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Oct. 9, 2017-Oct. 13, 2017, Oct. 8, 2017 (Oct. 8, 2017), 10 Pages, XP051340266, Retrieved from the Internet: URL: http://www.3gpp.org/ftp/Meetings_3GPP_SYNC/RAN1/Docs/ [retrieved on Oct. 8, 2017], p. 5-p. 6.

(Continued)

*Primary Examiner* — Jason E Mattis
(74) *Attorney, Agent, or Firm* — Holland & Hart LLP

(57) ABSTRACT

Methods, systems, and devices for wireless communications are described. In some wireless communications systems, a user equipment (UE) may be configured to transmit hybrid automatic repeat request (HARQ) feedback for a set of codewords received from a base station in a single uplink channel. In some cases, it may be appropriate for the UE to transmit individual HARQ feedback for each codeword of the set of codewords (e.g., such that the UE may be able to transmit HARQ feedback for unscheduled transmissions to provide side information to the base station), and, in other cases, it may be appropriate for the UE to transmit bundled HARQ feedback for the set of codewords. Using the techniques described herein, the base station may configure the UE to provide individual HARQ feedback or bundled HARQ feedback for a set of codewords based on one or more factors.

30 Claims, 12 Drawing Sheets

(51) Int. Cl.
*H04L 1/16* (2006.01)
*H04W 76/27* (2018.01)

(52) U.S. Cl.
CPC ... *H04W 72/1268* (2013.01); *H04W 72/1289* (2013.01); *H04W 76/27* (2018.02)

(56) References Cited

U.S. PATENT DOCUMENTS

2018/0019842 A1* 1/2018 Fu .................... H04L 1/1864
2020/0028635 A1* 1/2020 Lee .................... H04L 1/08

OTHER PUBLICATIONS

Huawei, et al., "Summary of Remaining Issues on CBG-based (re)Transmission", 3GPP TSG RAN WG1 Ad Hoc Meeting, 3GPP Draft; R1-1800075, 3rd Generation Partnership Project (3GPP), Mobile Competence Centre; 650, Route Des Lucioles; F-06921 Sophia-Antipolis Cedex; France, vol. RAN WG1, No. Vancouver, Canada; Jan. 22, 2018-Jan. 26, 2018, Jan. 13, 2018 (Jan. 13, 2018), 7 Pages, XP051384578, Retrieved from the Internet: URL: http://www.3gpp.org/ftp/tsg%5Fran/WG1%5FRL1/TSGR1%5FAH/NR%5FAH%5F1801/Docs/ [retrieved on Jan. 13, 2018], paragraph [03.2]-paragraph [03.3].

International Search Report and Written Opinion—PCT/US2019/025175—ISA/EPO—dated Jun. 26, 2019.

OPPO: "Remaining Issues on HARO-ACK Bundling", 3GPP TSG RAN WG1 Meeting AH 1801, 3GPP Draft; R1-1800769, 3rd Generation Partnership Project (3GPP), Mobile Competence Centre; 650, Route Des Lucioles; F-06921 Sophia-Antipolis Cedex; France, vol. RAN WG1, No. Vancouver, Canada; Jan. 22, 2018-Jan. 26, 2018, Jan. 12, 2018 (Jan. 12, 2018), XP051384425, 3 Pages, Retrieved from the Internet: URL: http://www.3gpp.org/ftp/tsg%5Fran/WG1%5FRL1/TSGR1%5FAH/NR%5FAH%5F1801/Docs/ [retrieved on Jan. 12, 2018] the whole document.

Zte, et al., "Summary of Email Discussion [90-09] on sPUCCH Format Design", 3GPP TSG RAN WG1 Meeting #90bis, 3GPP Draft; R1-1717702 Summary of Email Discussion 90-09 on sPUCCH Format Design, 3rd Generation Partnership Project (3GPP), Mobile Competence Centre; 650, Route Des Lucioles; F-06921 Sophia-Antipolis, vol. RAN WG1, No. Prague, Czech Republic; Oct. 9, 2017-Oct. 13, 2017, Oct. 8, 2017 (Oct. 8, 2017), XP051340887, 23 Pages, Retrieved from the Internet: URL: http://www.3gpp.org/ftp/Meetings_3GPP_SYNC/RAN1/Docs/ [retrieved on Oct. 8, 2017], Q2; p 3.

* cited by examiner

HYBRID AUTOMATIC REPEAT REQUEST FEEDBACK IN A PHYSICAL UPLINK CHANNEL

CROSS REFERENCES

The present application for patent claims the benefit of U.S. Provisional Patent Application No. 62/651,627 by HOSSEINI, et al., entitled "HYBRID AUTOMATIC REPEAT REQUEST FEEDBACK IN A PHYSICAL UPLINK CHANNEL," filed Apr. 2, 2018, assigned to the assignee hereof, and expressly incorporated by reference herein.

BACKGROUND

The following relates generally to wireless communication and more specifically to hybrid automatic repeat request (HARQ) feedback in a physical uplink channel.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Some wireless communications systems may support error correction schemes to improve the likelihood that codewords transmitted by a transmitting device are correctly received by a receiving device. HARQ is one example of an error correction scheme that increases the likelihood that information is received correctly over a wireless communications link. In HARQ, when a receiving device successfully decodes or fails to decode data received from a transmitting device, the receiving device may transmit HARQ feedback to the transmitting device to indicate whether the data was successfully decoded. The transmitting device may receive the HARQ feedback and determine whether to retransmit the data to the receiving device based on the HARQ feedback. In some cases, a transmitting device (e.g., a base station) may be scheduled to transmit one or more codewords to a receiving device (e.g., a UE) in a short period of time (e.g., in one or more shortened transmission time intervals (sTTIs)), and the receiving device may be configured to transmit HARQ feedback to the transmitting device after the scheduled transmissions. Conventional techniques for providing HARQ feedback for codewords received in a short period of time (e.g., in one or more sTTIs) may be deficient.

SUMMARY

In some wireless communications systems, a user equipment (UE) may be configured to transmit hybrid automatic repeat request (HARQ) feedback to a base station in a single uplink channel for a set of codewords received from the base station. In some cases, it may be appropriate for the UE to transmit individual HARQ feedback for each codeword of the set of codewords (e.g., such that the UE may be able to transmit HARQ feedback for unscheduled transmissions to provide side information to the base station), and, in other cases, it may be appropriate for the UE to transmit bundled HARQ feedback for the set of codewords (e.g., such that the UE may be able to transmit the HARQ feedback with increased power). Using the techniques described herein, a base station may configure a UE to provide individual HARQ feedback or bundled HARQ feedback for a set of codewords based on one or more factors to enhance the reliability of the HARQ feedback. For instance, for low latency communications, the base station may configure the UE to provide bundled HARQ feedback for a set of codewords since there may likely be no unscheduled transmissions and, as a result, no opportunity for the UE to provide side information to the base station. The decision regarding whether to bundle the HARQ feedback may alternatively, or additionally, be based on a length of the uplink transmission time interval used to transmit the HARQ feedback. The HARQ feedback may be transmitted, for example, in bundled form, on either an uplink control channel or an uplink data channel.

A method for wireless communication at a UE is described. The method may include monitoring for a plurality of codewords from a base station in respective transmission time intervals, identifying that the UE is configured to include HARQ feedback for the plurality of codewords in a single uplink channel transmission, determining, based at least in part on an indication received from the base station, whether to include individual HARQ feedback for each of the plurality of codewords, or to include bundled HARQ feedback for the plurality of codewords in the single uplink channel transmission, and transmitting the HARQ feedback for the plurality of codewords in the single uplink channel based at least in part on the determination.

An apparatus for wireless communication at a UE is described. The apparatus may include means for monitoring for a plurality of codewords from a base station in respective transmission time intervals, means for identifying that the UE is configured to include HARQ feedback for the plurality of codewords in a single uplink channel transmission, means for determining, based at least in part on an indication received from the base station, whether to include individual HARQ feedback for each of the plurality of codewords in the single uplink channel transmission, or to include bundled HARQ feedback for the plurality of codewords, and means for transmitting the HARQ feedback for the plurality of codewords in the single uplink channel based at least in part on the determination.

Another apparatus for wireless communication at a UE is described. The apparatus may include a processor, memory in electronic communication with the processor, and instructions stored in the memory. The instructions may be operable to cause the processor to monitor for a plurality of codewords from a base station in respective transmission time intervals, identify that the UE is configured to include HARQ feedback for the plurality of codewords in a single uplink channel transmission, determine, based at least in part on an indication received from the base station, whether to include individual HARQ feedback for each of the plurality of codewords in the single uplink channel transmission, or to include bundled HARQ feedback for the plurality of codewords, and transmit the HARQ feedback for the plurality of codewords in the single uplink channel based at least in part on the determination.

A non-transitory computer-readable medium for wireless communication at a UE is described. The non-transitory computer-readable medium may include instructions operable to cause a processor to monitor for a plurality of codewords from a base station in respective transmission time intervals, identify that the UE is configured to include HARQ feedback for the plurality of codewords in a single uplink channel transmission, determine, based at least in part on an indication received from the base station, whether to include individual HARQ feedback for each of the plurality of codewords, or to include bundled HARQ feedback for the plurality of codewords in the single uplink channel transmission, and transmit the HARQ feedback for the plurality of codewords in the single uplink channel based at least in part on the determination.

In some examples of the method, apparatus, and non-transitory computer-readable medium described above, determining whether to include individual HARQ feedback or bundled HARQ feedback is independent of whether a number of bits for the individual HARQ feedback exceeds a maximum payload size of the single uplink channel transmission. In some examples of the method, apparatus, and non-transitory computer-readable medium described above, including bundled HARQ feedback in the single uplink channel transmission results in a number of HARQ feedback bits included in the single uplink channel transmission being less than a maximum payload size of the single uplink channel transmission.

In some examples of the method, apparatus, and non-transitory computer-readable medium described above, the indication may be received in a radio resource control (RRC) message or a downlink control information (DCI) message. Some examples of the method, apparatus, and non-transitory computer-readable medium described above may further include processes, features, means, or instructions for determining to include in the single uplink channel transmission bundled HARQ feedback for the plurality of codewords, and transmitting the bundled HARQ feedback for the plurality of codewords in the single uplink channel to the base station. Some examples of the method, apparatus, and non-transitory computer-readable medium described above may further include processes, features, means, or instructions for determining to include in the single uplink channel transmission individual HARQ feedback for each of the plurality of codewords while facilitating use of side information for decoding of the HARQ feedback, where the individual HARQ feedback includes HARQ feedback for at least one unscheduled transmission in the respective transmission time intervals, and transmitting the individual HARQ feedback for each of the plurality of codewords in the single uplink channel to the base station.

In some examples of the method, apparatus, and non-transitory computer-readable medium described above, including bundled HARQ feedback for the plurality of codewords comprises including a single acknowledgment (ACK) or negative acknowledgment (NACK) for the plurality of codewords. In some examples of the method, apparatus, and non-transitory computer-readable medium described above, the plurality of codewords may be time-division multiplexed, frequency division multiplexed, spatially multiplexed, or a combination thereof. In some examples of the method, apparatus, and non-transitory computer-readable medium described above, the single uplink channel comprises a physical uplink control channel (PUCCH), a shortened PUCCH (sPUCCH), a physical uplink shared channel (PUSCH), or a shortened PUSCH (sPUSCH). In some examples of the method, apparatus, and non-transitory computer-readable medium described above, monitoring for the plurality of codewords comprises monitoring a plurality of short physical downlink shared channels (sPDSCHs) for the plurality of codewords.

A method for wireless communication at a base station is described. The method may include establishing a connection with a UE, determining whether to configure the UE to include individual HARQ feedback for each codeword received from the base station or to include bundled HARQ feedback for codewords received from the base station, and transmitting an indication to the UE of whether to include individual HARQ feedback for each codeword received from the base station or to include bundled HARQ feedback for codewords received from the base station.

An apparatus for wireless communication at a base station is described. The apparatus may include means for establishing a connection with a UE, means for determining whether to configure the UE to include individual HARQ feedback for each codeword received from the base station or to include bundled HARQ feedback for codewords received from the base station, and means for transmitting an indication to the UE of whether to include individual HARQ feedback for each codeword received from the base station or to include bundled HARQ feedback for codewords received from the base station.

Another apparatus for wireless communication at a base station is described. The apparatus may include a processor, memory in electronic communication with the processor, and instructions stored in the memory. The instructions may be operable to cause the processor to establish a connection with a UE, determine whether to configure the UE to include individual HARQ feedback for each codeword received from the base station or to include bundled HARQ feedback for codewords received from the base station, and transmit an indication to the UE of whether to include individual HARQ feedback for each codeword received from the base station or to include bundled HARQ feedback for codewords received from the base station.

A non-transitory computer-readable medium for wireless communication at a base station is described. The non-transitory computer-readable medium may include instructions operable to cause a processor to establish a connection with a UE, determine whether to configure the UE to include individual HARQ feedback for each codeword received from the base station or to include bundled HARQ feedback for codewords received from the base station, and transmit an indication to the UE of whether to include individual HARQ feedback for each codeword received from the base station or to include bundled HARQ feedback for codewords received from the base station.

In some examples of the method, apparatus, and non-transitory computer-readable medium described above, the determining whether to configure the UE to include individual HARQ feedback for each codeword received from the base station while facilitating use of side information for decoding of the HARQ feedback or to include bundled HARQ feedback for codewords received from the base station may be based at least in part on a quality of the connection with the UE, a traffic type associated with the codewords, a duration of time during which the codewords are transmitted, or a combination thereof. In some examples of the method, apparatus, and non-transitory computer-readable medium described above, the indication configures the UE to include bundled HARQ feedback for codewords received from the base station. In some examples of the method, apparatus, and non-transitory computer-readable medium described above, the indication configures the UE to include individual HARQ feedback for each codeword received from the base station while facilitating use of side information for decoding of the HARQ feedback.

In some examples of the method, apparatus, and non-transitory computer-readable medium described above, the indication may be transmitted in a RRC message or a DCI message. In some examples of the method, apparatus, and non-transitory computer-readable medium described above, including bundled HARQ feedback for the codewords comprises including a single ACK or NACK for the codewords. In some examples of the method, apparatus, and non-transitory computer-readable medium described above, the indication indicates whether to include individual HARQ feedback or bundled HARQ feedback for codewords that may be time-division multiplexed, frequency division multiplexed, spatially multiplexed, or a combination thereof.

DETAILED DESCRIPTION

Figure 1:
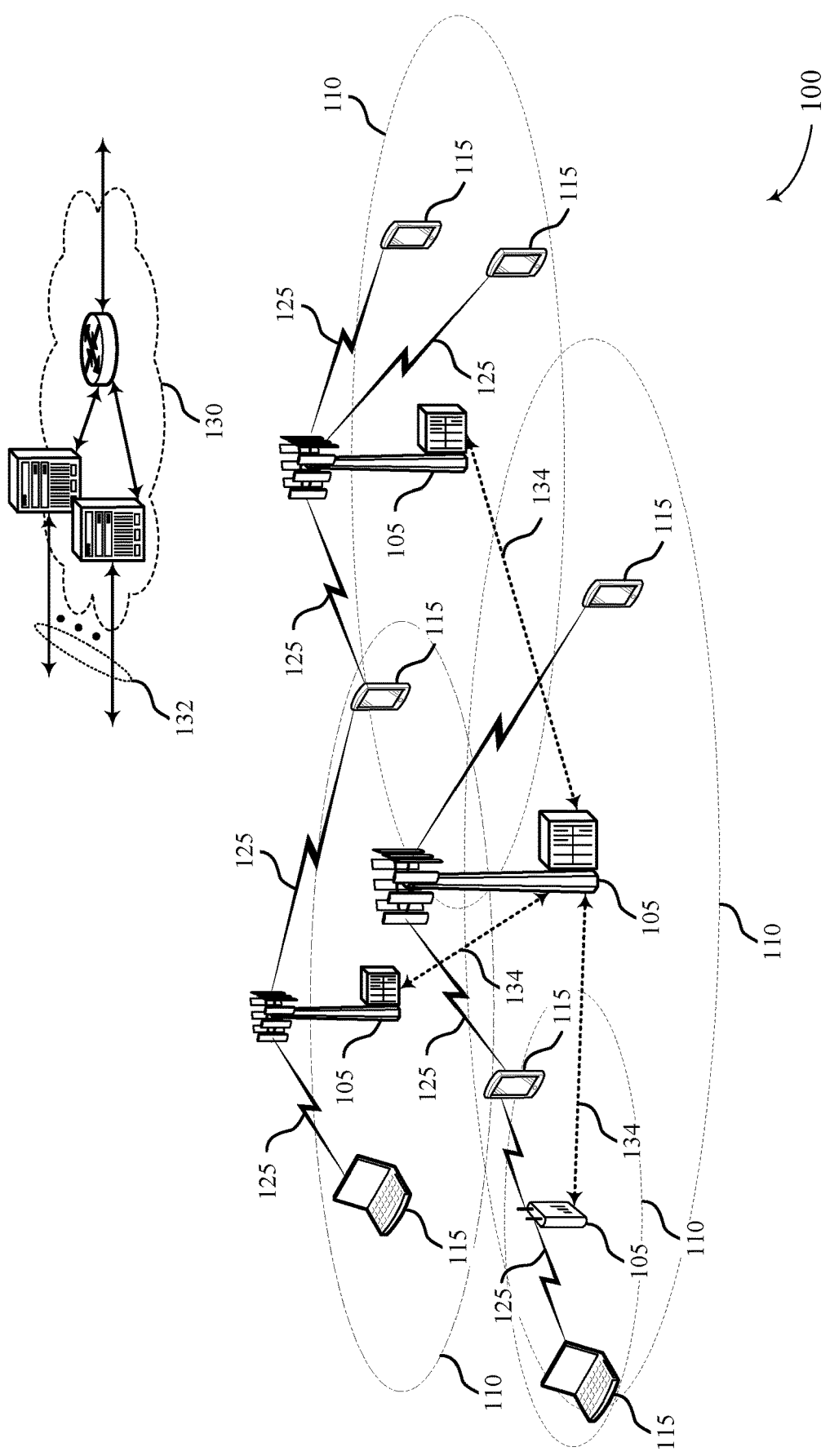
FIGS. 1 and 2 illustrate examples of wireless communications systems that support hybrid automatic repeat request (HARQ) feedback in a physical uplink channel in accordance with aspects of the present disclosure.

Some wireless communications systems may support hybrid automatic repeat request (HARQ) schemes to improve the likelihood that information is correctly received by a receiving device. In some implementations of HARQ, a user equipment (UE) may monitor a set of transmission time intervals (TTIs) (e.g., slots) for downlink transmissions from a base station, and the UE may provide individual HARQ feedback for each downlink transmission received in these TTIs. The transmission of individual HARQ feedback for each downlink transmission received from a base station may allow a UE to provide HARQ feedback for scheduled and unscheduled transmissions. Thus, when the base station is not scheduled to transmit data to the UE in a particular TTI, the UE may transmit a negative acknowledgment (NACK) for the unscheduled transmission to provide side information to the base station, which may be used by the base station (e.g., as a reference) in decoding other HARQ feedback received from the UE.

In some cases, however, a base station may be scheduled to transmit in all TTIs for which a UE may be configured to provide HARQ feedback. For instance, for low latency communications, a base station may utilize every TTI available to transmit data to a UE, and there may not be any unscheduled transmissions. Additionally, or alternatively, when the quality of a connection between a base station and a UE is above a threshold, the base station may be scheduled to use every TTI available to transmit data to the UE, and there may not be any unscheduled transmissions. Accordingly, the UE may not be able to provide side information to the base station in HARQ feedback transmitted to the base station (e.g., via a NACK for an unscheduled transmission). As a result, the gains associated with transmitting individual HARQ feedback for scheduled and unscheduled transmissions to a base station 105 may be compromised, which may be detrimental to a HARQ scheme in a wireless communications system.

As described herein, a wireless communications system may support efficient techniques for configuring a UE to provide HARQ feedback to a base station to improve the quality of a HARQ scheme in the wireless communications system. Specifically, a base station may selectively configure a UE to transmit individual HARQ feedback or bundled HARQ feedback for a set of downlink transmissions based on one or more factors (e.g., link quality, traffic type, TTI duration, etc.) that correspond to the likelihood that there will be an unscheduled transmission. When there is a high chance that there will be an unscheduled transmission for which the UE may transmit HARQ feedback to provide side information to the base station (e.g., for mobile broadband (MBB) communications), the base station may configure the UE to transmit individual HARQ feedback for scheduled and unscheduled downlink transmissions. Alternatively, when there is a low chance that there will be an unscheduled transmission for which the UE may transmit HARQ feedback to provide side information to the base station (e.g., for low latency communications), the base station may configure the UE to transmit bundled HARQ feedback for downlink transmissions (i.e., such that the UE may be able to use an increased power to transmit the bundled HARQ feedback to the base station).

Aspects of the disclosure introduced above are described below in the context of a wireless communications system. Examples of processes and signaling exchanges that support HARQ feedback in a physical uplink channel are then described. Aspects of the disclosure are further illustrated by and described with reference to apparatus diagrams, system diagrams, and flowcharts that relate to HARQ feedback in a physical uplink channel.

FIG. 1 illustrates an example of a wireless communications system 100 that supports HARQ feedback in a physical uplink channel in accordance with various aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105 (e.g., in a physical uplink control channel (PUCCH), a shortened PUCCH (sPUCCH), a physical uplink shared channel (PUSCH), or a shortened PUSCH (sPUSCH)), or downlink transmissions from a base station 105 to a UE 115 (e.g., in a physical downlink control channel (PDCCH), a shortened PDCCH (sPDCCH), a physical downlink shared channel (PDSCH), or a shortened PDSCH (sPDSCH)). Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a TTI. In other cases, a smallest scheduling unit of the wireless communications system 100 may be shorter than a subframe or may be dynamically selected (e.g., in bursts of shortened TTIs (sTTIs) or in selected component carriers using sTTIs).

In some cases, UEs 115 and base stations 105 may support retransmissions of data to increase the likelihood that data is received successfully. HARQ feedback is one technique of increasing the likelihood that data is received correctly over a communication link 125. HARQ feedback may include the transmission of an acknowledgment (ACK) from a receiving device to indicate that data (or other information) received from the transmitting device was successfully decoded, and the transmission of a NACK from a receiving device to indicate that the receiving device failed to successfully decode the data (or other information) received from the transmitting device. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions).

In some wireless communications systems (e.g., wireless communications system 100), a base station 105 may be scheduled to transmit multiple codewords to a UE 115 in a short period of time, and the UE 115 may be configured to provide HARQ feedback for the transmitted codewords in a single uplink channel. For instance, the base station 105 may be scheduled to transmit three codewords in three sTTIs (e.g., two-symbol and/or three-symbol sTTIs) within a slot, and the UE 115 may be configured to provide HARQ feedback for the multiple codewords in a single uplink channel of a subsequent slot (e.g., for a {2, 7} configuration). Alternatively, the base station 105 may be scheduled to transmit multiple codewords within a slot (e.g., in multiple unicast transmissions, though the slot may not be divided into sTTIs), and the UE 115 may be configured to provide HARQ feedback for the multiple codewords in a single uplink transmission of a subsequent slot.

In such systems, the UE 115 may transmit a single codeword in a single uplink channel including individual HARQ feedback for each codeword transmitted by base station 105 on a particular carrier. That is, the UE 115 may include an ACK or NACK for each codeword transmitted by base station 105. Further, in some cases, the base station 105 may not schedule transmissions in all TTIs or sTTIs for which the UE 115 may be configured to transmit HARQ feedback. Accordingly, the UE 115 may be configured to either transmit a NACK for the unscheduled transmissions (e.g., in accordance with a static codebook design) or to avoid transmitting HARQ feedback for the unscheduled transmissions. For example, when one out of three transmissions is scheduled (e.g., in one out of three sTTIs), the UE 115 may be configured to transmit an ACK/NACK for the scheduled transmission and NACKs for the unscheduled transmissions, or the UE 115 may be configured to transmit only an ACK/NACK for the scheduled transmission.

The transmission of individual HARQ feedback including NACKs for unscheduled transmissions may allow a UE 115 to provide side information to a base station 105. The side information may be used by the base station 105 (e.g., as a reference) in decoding other HARQ feedback received from the UE 115. On the other hand, the transmission of HARQ feedback for only scheduled downlink transmissions may allow a UE 115 to transmit the HARQ feedback with increased power. Because HARQ feedback for scheduled and unscheduled downlink transmissions may be used to provide side information and HARQ feedback for only scheduled downlink transmissions may be transmitted with increased power, these different techniques for providing HARQ feedback may have the same (or similar) performance in a wireless communications system (e.g., assuming a Reed-Muller code is used to encode the transmissions). Thus, to limit complexity, in current systems, the UE 115 may be configured to transmit HARQ feedback for scheduled and unscheduled transmissions instead of being configured to transmit HARQ feedback for only scheduled transmissions or being configured to transmit bundled HARQ feedback.

In some cases, however, a base station 105 may be scheduled to transmit a codeword in every TTI for which a UE 115 may be configured to transmit HARQ feedback. For instance, for low latency communications, a base station 105 may utilize every TTI to transmit data to a UE 115, and there may not be any unscheduled transmissions. Accordingly, the UE 115 may not be able to provide side information to the base station 105 in HARQ feedback transmitted to the base station 105, and the base station 105 may not have access to any side information to assist in decoding HARQ feedback received from the UE 115. Thus, the gains associated with transmitting individual HARQ feedback for scheduled and unscheduled transmissions to a base station 105 may be compromised, which may be detrimental to a wireless communications system. As described herein, wireless communications system 100 may support efficient techniques for configuring a UE 115 to provide HARQ feedback to a base station 105 to improve the quality of a HARQ scheme in wireless communications system 100.

Figure 2:
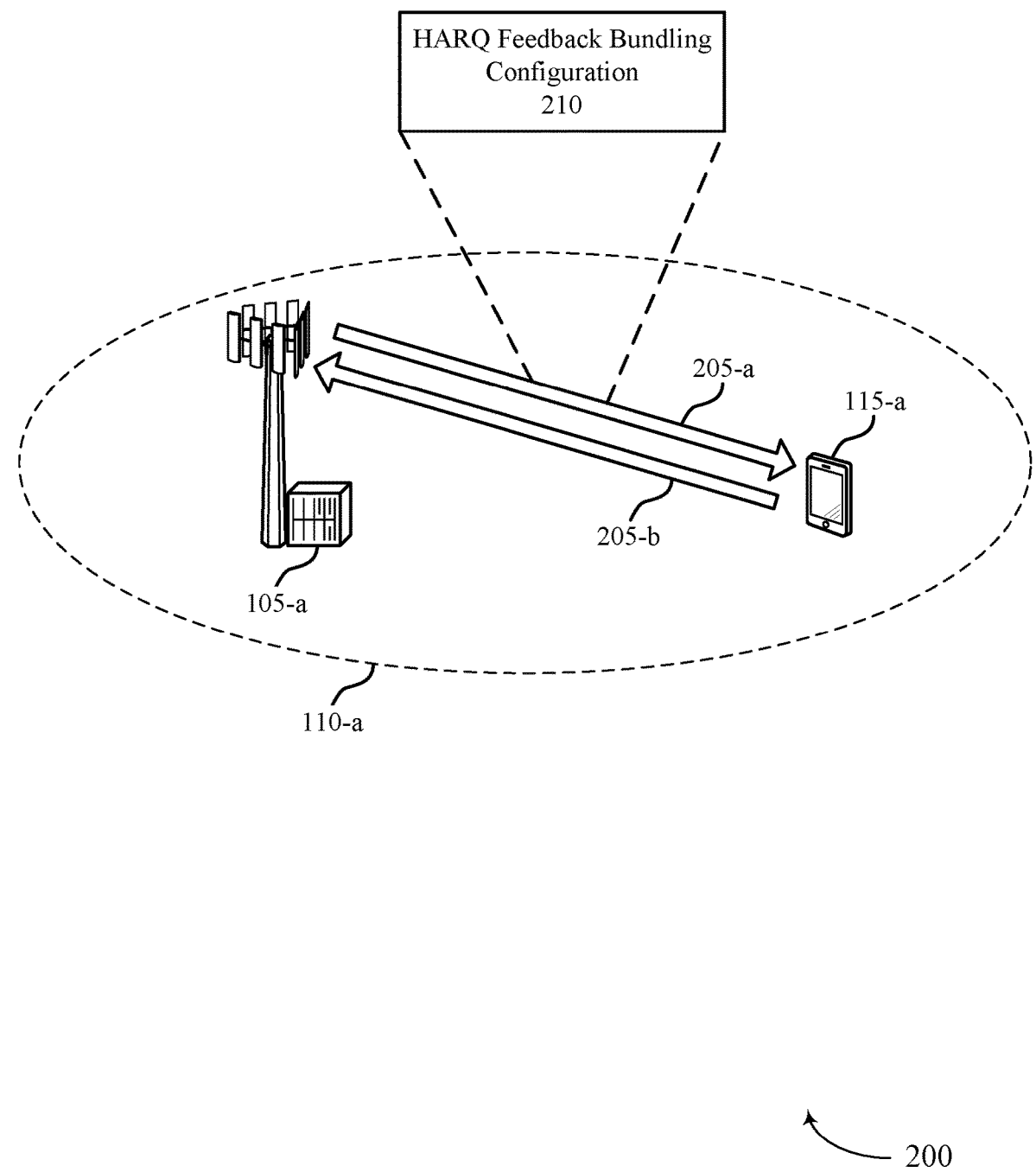

FIG. 2 illustrates an example of a wireless communications system 200 that supports HARQ feedback in a physical uplink channel in accordance with various aspects of the present disclosure. Wireless communications system 200 includes base station 105-a and UE 115-a, which may be examples of the corresponding devices described with reference to FIG. 1. Base station 105-a may communicate with UEs 115 (including UE 115-a) within coverage area 110-a. For example, base station 105-a may transmit downlink signals to UE 115-a on resources of a carrier 205-a, and UE 115-a may transmit uplink signals to base station 105-a on resources of a carrier 205-b (e.g., which may be the same as or different from carrier 205-a). Wireless communications system 200 may implement aspects of wireless communications system 100. For example, wireless communications system 200 may support efficient techniques for configuring a UE 115 to provide HARQ feedback to a base station 105 to improve the quality of a HARQ scheme in wireless communications system 200.

As discussed with reference to FIG. 1, in some cases, base station 105 may not be scheduled to transmit data (e.g., in a PDSCH) in each TTI for which UE 115-*a* may be configured to provide HARQ feedback. In other cases, base station 105-*a* may be scheduled to transmit data in each TTI for which UE 115-*a* may be configured to provide HARQ feedback. Thus, in some cases, it may be appropriate for UE 115-*a* to transmit HARQ feedback for scheduled and unscheduled transmissions to base station 105-*a* (e.g., when it is likely that there will be an unscheduled transmission for which the UE 115-*a* may transmit HARQ feedback to base station 105-*a* to provide side information to base station 105-*a*), and, in other cases, it may be appropriate for UE 115-*a* to transmit bundled HARQ feedback (e.g., when it is likely that there will be no unscheduled transmissions for which the UE 115-*a* may transmit HARQ feedback to base station 105-*a* to provide side information to base station 105-*a*).

As described herein, wireless communications system 200 may support efficient techniques for dynamically configuring UE 115-*a* to transmit individual HARQ feedback or bundled HARQ feedback to base station 105-*a* for a set of codewords. In particular, base station 105-*a* may configure UE 115-*a* to transmit individual HARQ feedback or bundled HARQ feedback for a set of codewords based on the likelihood that there will be an unscheduled transmission for which UE 115-*a* may transmit HARQ feedback to base station 105-*a* to provide side information to base station 105-*a*. For example, because an uplink channel transmission may have a maximum payload size, UE 115-*a* may be configured to transmit individual HARQ feedback for multiple data channels when it is likely that there is an unscheduled transmission in at least one of the data channels (e.g., such that the HARQ feedback for the unscheduled transmission may be used as side information), and UE 115-*a* may be configured to transmit bundled HARQ feedback for the multiple data channels when it is unlikely that there is an unscheduled transmission in the data channels (e.g., such that there may be bits available for side information after bundling). In some cases, base station 105-*a* may determine the likelihood that there will be an unscheduled transmission based on a quality of a connection between base station 105-*a* and UE 115-*a*, a traffic type associated with communications between base station 105-*a* and UE 115-*a*, or a length of the TTIs used for communications between base station 105-*a* and UE 115-*a*.

Figure 3A:
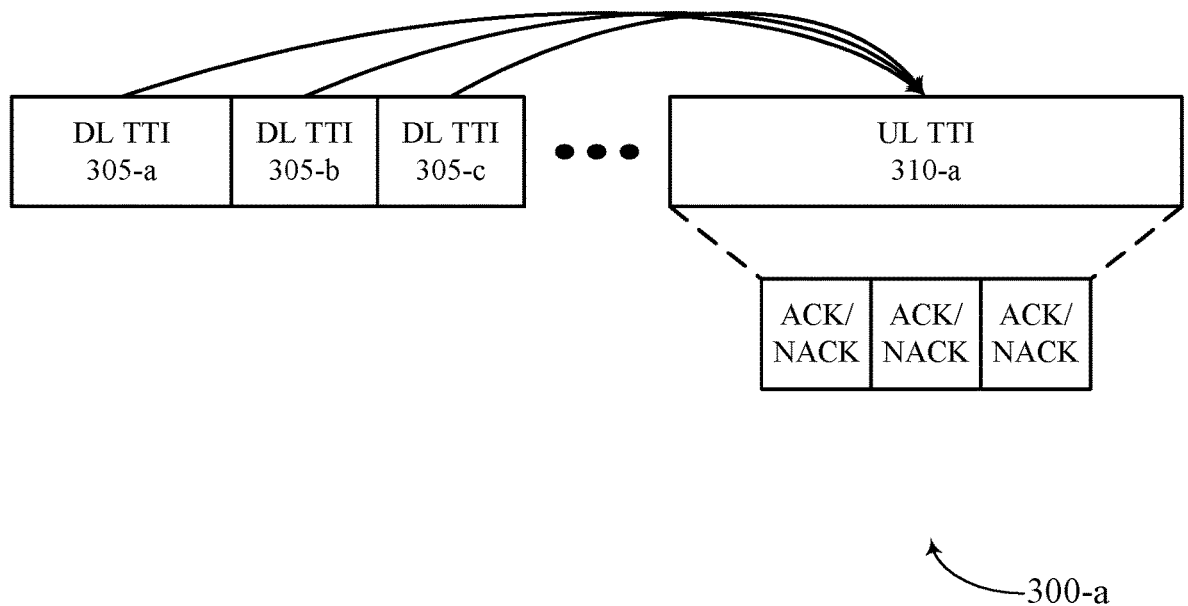
FIGS. 3A and 3B illustrate examples of HARQ feedback in a physical uplink channel in accordance with aspects of the present disclosure.

If base station 105-*a* determines that the chances that there will be at least one unscheduled transmission is high (e.g., based on determining that the quality of the connection between base station 105-*a* and UE 115-*a* is below a threshold, determining that base station 105-*a* is scheduled for MBB communications with UE 115-*a*, or determining that the length of the TTIs used for communications between base station 105-*a* and UE 115-*a* is above a threshold), base station 105-*a* may transmit a HARQ feedback bundling configuration 210 to UE 115-*a* that may configure UE 115-*a* to transmit individual HARQ feedback for scheduled and unscheduled transmissions to base station 105-*a* (i.e., to allow UE 115-*a* to provide side information to base station 105-*a*). FIG. 3A illustrates an example of individual HARQ feedback 300-*a* transmitted by UE 115-*a* in a single uplink channel in accordance with aspects of the present disclosure. In the example of FIG. 3A, UE 115-*a* may transmit individual HARQ feedback in an uplink TTI 310-*a* for each scheduled or unscheduled transmission in downlink TTIs 305-*a*, 305-*b*, and 305-*c* (i.e., an ACK/NACK corresponding to a transmission in each downlink TTI 305).

Figure 3B:
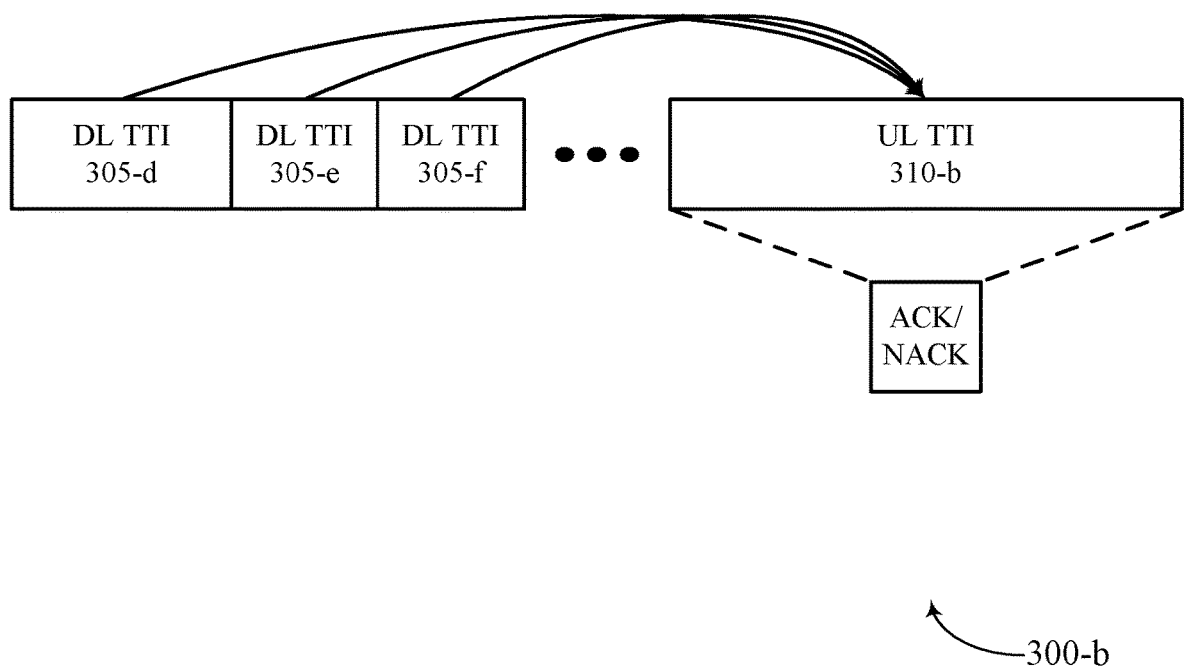

Alternatively, if base station 105-*a* determines that the chances that there will be at least one unscheduled transmission is low (e.g., based on determining that the quality of the connection between base station 105-*a* and UE 115-*a* is above a threshold, determining that base station 105-*a* is scheduled for low latency communications with UE 115-*a*, or determining that the length of the TTIs used for communications between base station 105-*a* and UE 115-*a* is below a threshold), base station 105-*a* may transmit a HARQ feedback bundling configuration 210 to UE 115-*a* that may configure UE 115-*a* to transmit bundled HARQ feedback to base station 105-*a* for transmissions received from base station 105-*a*. FIG. 3B illustrates an example of bundled HARQ feedback 300-*b* transmitted by UE 115-*a* in a single uplink channel in accordance with aspects of the present disclosure. In the example of FIG. 3B, UE 115-*a* may transmit bundled HARQ feedback in an uplink TTI 310-*b* for the transmissions in downlink TTIs 305-*d*, 305-*e*, and 305-*f* (i.e., a single ACK/NACK for multiple transmissions in downlink TTIs 305-*d*, 305-*e*, and 305-*f*).

Although the examples described above are related to providing HARQ feedback for downlink transmissions across TTIs (i.e., time division multiplexed downlink transmissions), it is to be understood that the same techniques may be applied for providing HARQ feedback for downlink transmissions (or codewords) received in one or more TTIs across different carriers (i.e., frequency division multiplexed) or across different spatial layers (i.e., spatially multiplexed). Additionally, or alternatively, bundled HARQ feedback for downlink transmissions (or codewords) may be in different dimensions (e.g., time, frequency, or spatial).

Figure 4:
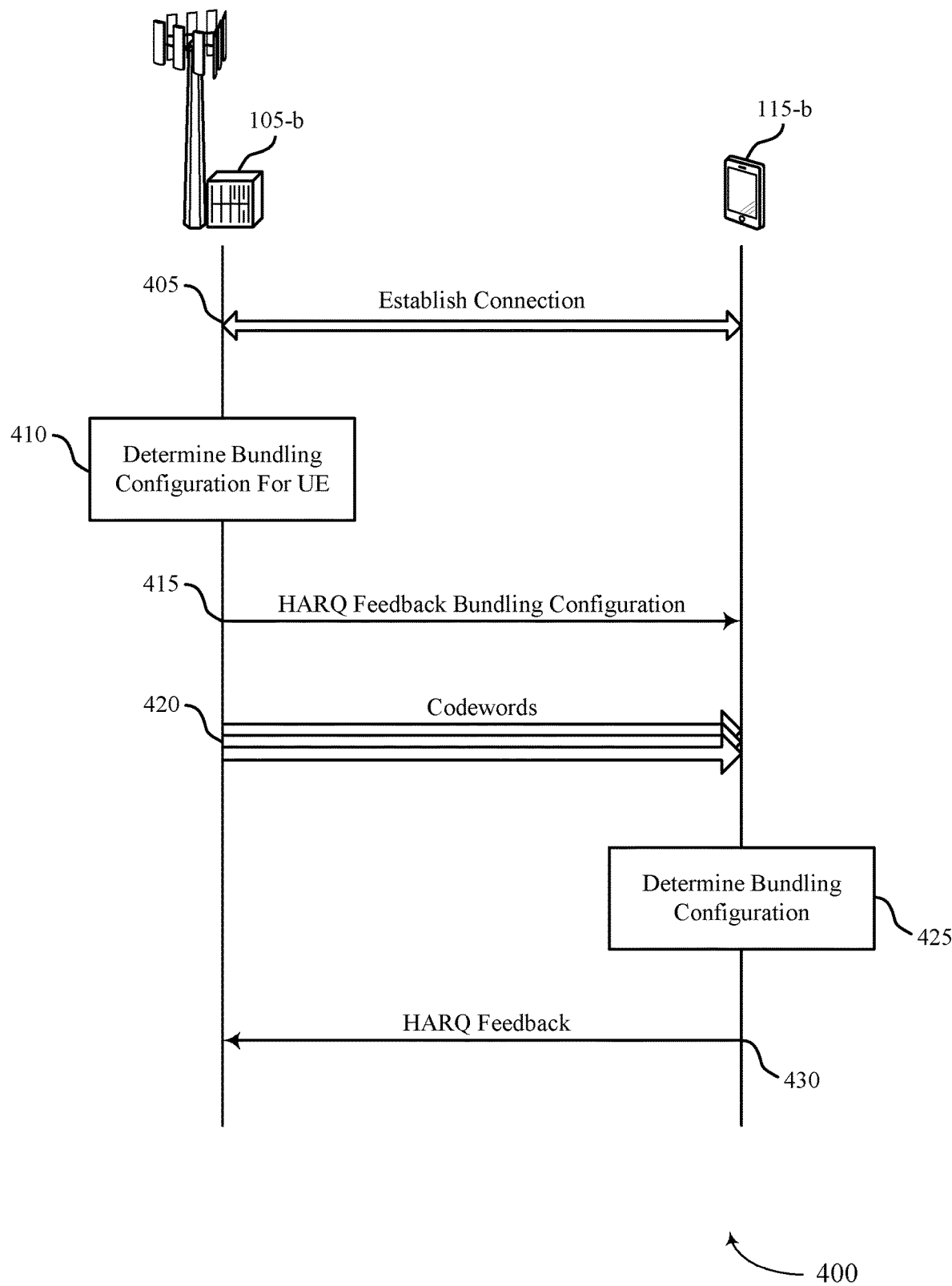
FIG. 4 illustrates an example of a process flow that supports HARQ feedback in a physical uplink channel in accordance with aspects of the present disclosure.

FIG. 4 illustrates an example of a process flow 400 that supports HARQ feedback in a physical uplink channel in accordance with various aspects of the present disclosure. Process flow 400 illustrates aspects of techniques performed by a base station 105-*b*, which may be an example of a base station 105 described with reference to FIGS. 1-3. Process flow 400 also illustrates aspects of techniques performed by a UE 115-*b*, which may be an example of a UE 115 described with reference to FIGS. 1-3.

At 405, base station 105-*b* may establish a connection with UE 115-*b*, and, at 410, base station 105-*b* may determine a bundling configuration for UE 115-*b*. The bundling configuration may be used to configure UE 115-*b* to either include individual HARQ feedback for each codeword received from base station 105-*b* while facilitating use of side information for decoding of the HARQ feedback or to include bundled HARQ feedback for codewords received from base station 105-*b* (e.g., while also facilitating the use of side information for decoding of the HARQ feedback). In some cases, base station 105-*b* may determine the bundling configuration based on a quality of the connection with UE 115-*b*, a traffic type associated with communications with UE 115-*b*, or a duration of TTIs used to communicate with UE 115-*b*.

In addition to indicating whether UE 115-*b* is configured to bundle HARQ feedback, the bundling configuration may indicate a bundling scheme to be used by UE 115-*b* (i.e., if bundling is configured). The bundling scheme may correspond to a number of bits used to provide HARQ feedback for a set of codewords, the codewords to be grouped for bundling, etc. Further, the bundling scheme may also be identified based on a quality of the connection with UE 115-*b*, a traffic type associated with communications with UE 115-*b*, or a duration of TTIs used to communicate with UE 115-*b*. At 415, base station 105-*b* may then transmit the HARQ feedback bundling configuration based on the determination at 410 (e.g., in an RRC message or DCI message).

At 420, base station 105-b may transmit multiple codewords to UE 115-b, and UE 115-b may monitor at least one TTI for the multiple codewords from base station 105-b. At 425, UE 115-b may then determine, based on the HARQ feedback bundling configuration indication received at 415, whether to include in a single uplink channel (e.g., PUCCH, sPUCCH, PUSCH, sPUSCH) individual HARQ feedback for each of the multiple codewords while facilitating use of side information for decoding of the HARQ feedback, or to include bundled HARQ feedback for the multiple codewords. Because UE 115-b determines whether to bundle HARQ feedback based on the indication from base station 105-b, and base station 105-b determines whether to configure UE 115-b to bundle using the indication based on a quality of the connection with UE 115-b, a traffic type associated with communications with UE 115-b, or a duration of TTIs used to communicate with UE 115-b, it is to be understood that UE 115-b determines whether to bundle based on the quality of the connection with UE 115-b, a traffic type associated with communications with UE 115-b, or a duration of TTIs used to communicate with UE 115-b. In some cases, the multiple codewords may be time division multiplexed, frequency division multiplexed, or spatially multiplexed.

In some cases, UE 115-b may determine to include in the single uplink channel bundled HARQ feedback for the multiple codewords (e.g., based on an indication from base station 105-b that UE 115-b is to include bundled HARQ feedback for codewords received from base station 105-b), and, at 430, UE 115-b may transmit the bundled HARQ feedback for the multiple codewords in the single uplink channel to base station 105-b. In other cases, UE 115-b may determine to include in the single uplink channel individual HARQ feedback for each of the multiple codewords while facilitating use of side information for decoding of the HARQ feedback (e.g., based on an indication from base station 105-b that UE 115-b is to include individual HARQ feedback for each codeword received from base station 105-b), and, at 430, UE 115-b may transmit the individual HARQ feedback for each of the multiple codewords in the single uplink channel to base station 105-b.

Figure 5:
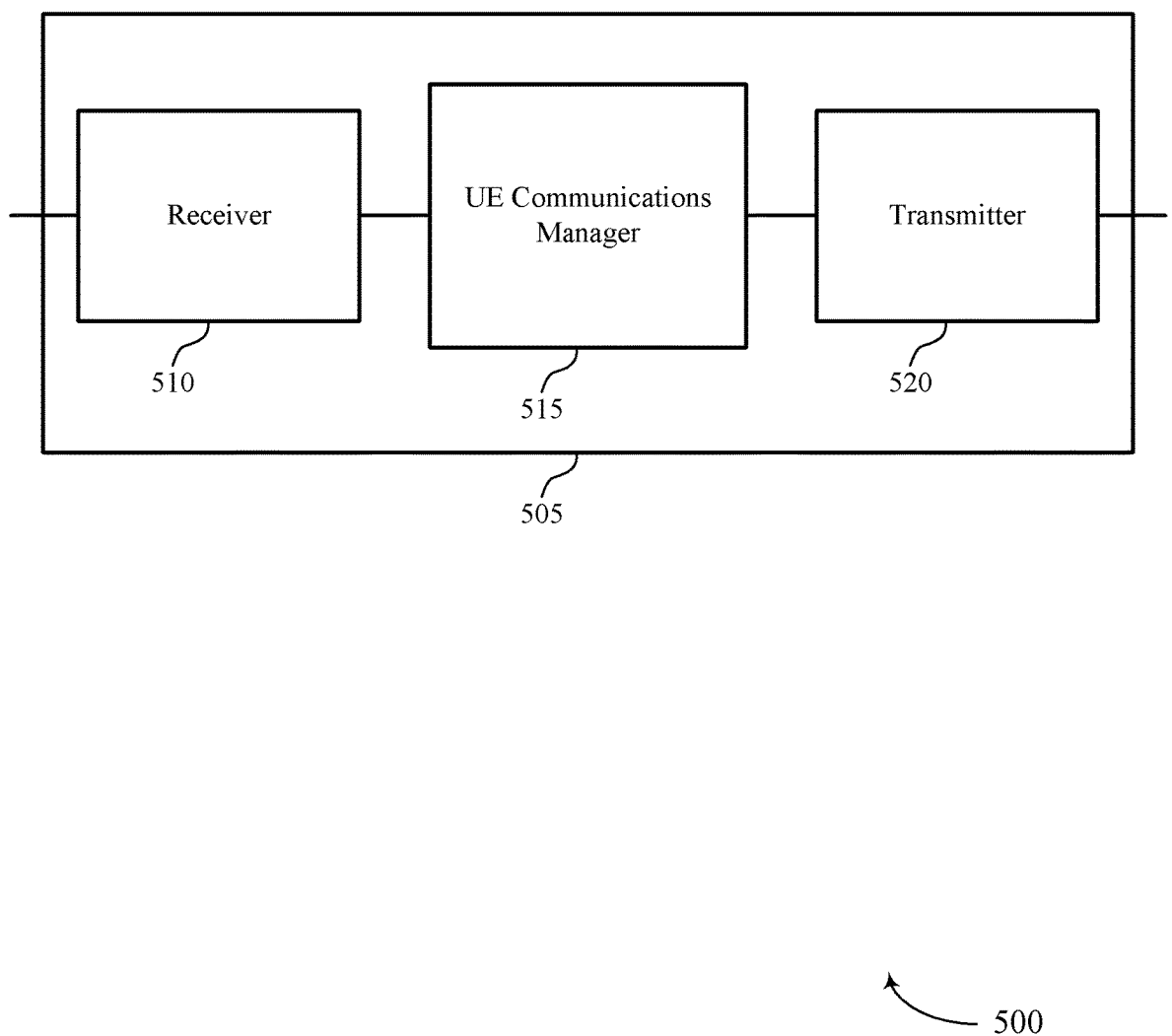
FIGS. 5 and 6 show block diagrams of a device that supports HARQ feedback in a physical uplink channel in accordance with aspects of the present disclosure.

FIG. 5 shows a block diagram 500 of a wireless device 505 that supports HARQ feedback in a physical uplink channel in accordance with aspects of the present disclosure. Wireless device 505 may be an example of aspects of a UE 115 as described herein. Wireless device 505 may include receiver 510, UE communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to HARQ feedback in a physical uplink channel, etc.). Information may be passed on to other components of the device. The receiver 510 may be an example of aspects of the transceiver 735 described with reference to FIG. 7. The receiver 510 may utilize a single antenna or a set of antennas.

UE communications manager 515 may be an example of aspects of the UE communications manager 715 described with reference to FIG. 7. UE communications manager 515 and/or at least some of its various sub-components may be implemented in hardware, software executed by a processor, firmware, or any combination thereof. If implemented in software executed by a processor, the functions of the UE communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 515 and/or at least some of its various sub-components may be physically located at various positions, including being distributed such that portions of functions are implemented at different physical locations by one or more physical devices. In some examples, UE communications manager 515 and/or at least some of its various sub-components may be a separate and distinct component in accordance with various aspects of the present disclosure. In other examples, UE communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 515 may monitor for a set of codewords from a base station in respective transmission time intervals, identify that the UE is configured to include HARQ feedback for the set of codewords in a single uplink channel transmission, determine, based on an indication received from the base station, whether to include individual HARQ feedback for each of the set of codewords, or to include bundled HARQ feedback for the set of codewords in the single uplink channel transmission, and transmit the HARQ feedback for the set of codewords in the single uplink channel based on the determination.

Transmitter 520 may transmit signals generated by other components of the device. In some examples, the transmitter 520 may be collocated with a receiver 510 in a transceiver module. For example, the transmitter 520 may be an example of aspects of the transceiver 735 described with reference to FIG. 7. The transmitter 520 may utilize a single antenna or a set of antennas.

Figure 6:
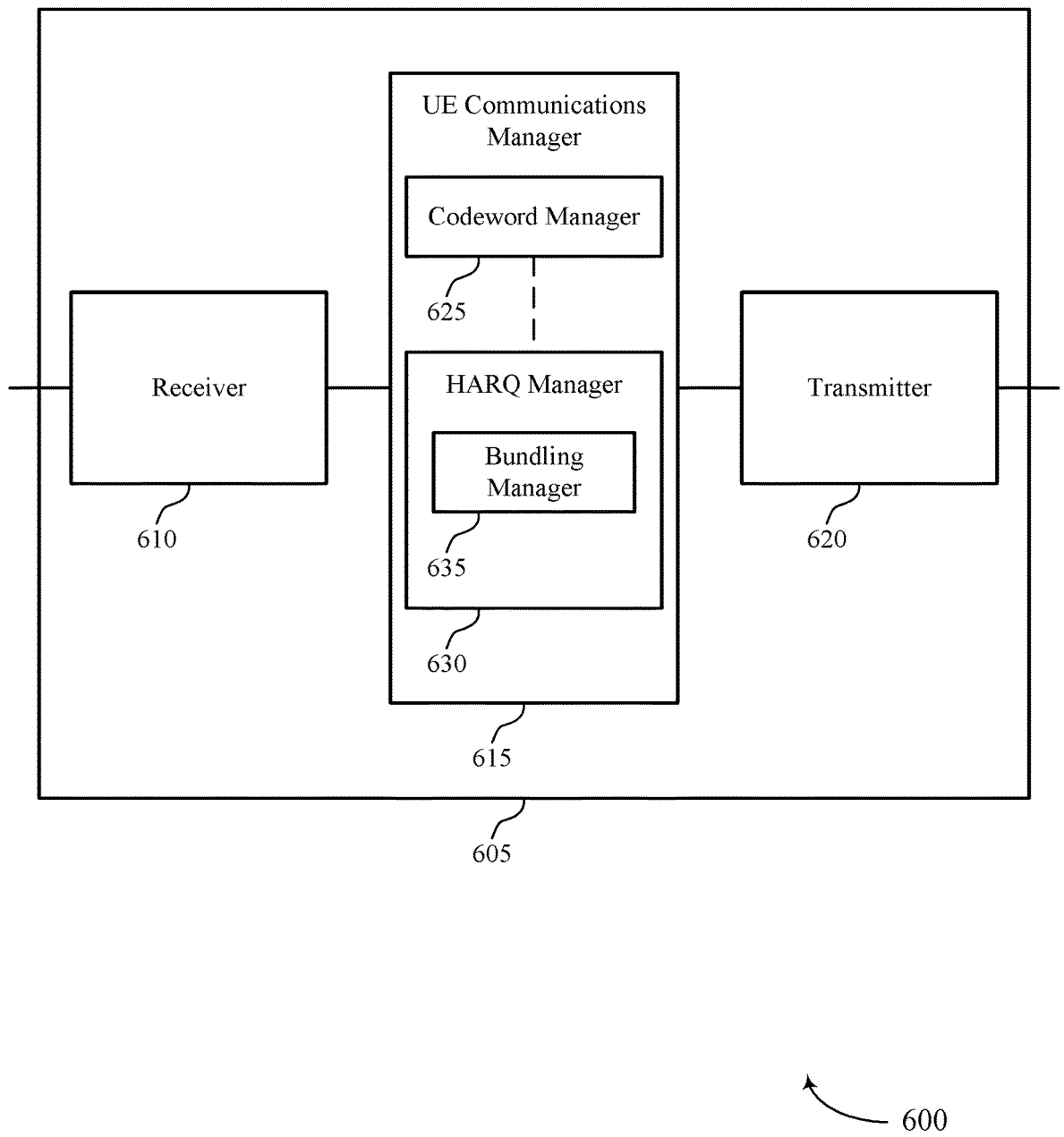

FIG. 6 shows a block diagram 600 of a wireless device 605 that supports HARQ feedback in a physical uplink channel in accordance with aspects of the present disclosure. Wireless device 605 may be an example of aspects of a wireless device 505 or a UE 115 as described with reference to FIG. 5. Wireless device 605 may include receiver 610, UE communications manager 615, and transmitter 620. UE communications manager 615 may be an example of aspects of the UE communications manager 715 described with reference to FIG. 7. UE communications manager 615 may include codeword manager 625 and HARQ manager 630. HARQ manager 630 may include bundling manager 635. Wireless device 605 may also include a processor. Each of these components may be in communication with one another (e.g., via one or more buses).

Receiver 610 may receive information such as packets, user data, or control information associated with various information channels (e.g., control channels, data channels, and information related to HARQ feedback in a physical uplink channel, etc.). Information may be passed on to other components of the device. The receiver 610 may be an example of aspects of the transceiver 735 described with reference to FIG. 7. The receiver 610 may utilize a single antenna or a set of antennas.

Codeword manager 625 may monitor for a set of codewords from a base station in respective transmission time intervals. In some cases, the set of codewords are time-division multiplexed, frequency division multiplexed, spatially multiplexed, or a combination thereof. In some cases, monitoring for the plurality of codewords includes monitoring a plurality of short PDSCHs (sPDSCHs) for the plurality of codewords. HARQ manager 630 may identify that the UE is configured to include HARQ feedback for the set of codewords in a single uplink channel transmission. In some cases, the single uplink channel includes a PUCCH, a sPUCCH, a PUSCH, or a sPUSCH.

Bundling manager 635 may determine, based on an indication received from the base station, whether to include individual HARQ feedback for each of the set of codewords, or to include bundled HARQ feedback for the set of codewords in the single uplink channel transmission. In some cases, determining whether to include individual HARQ feedback or bundled HARQ feedback is independent of whether a number of bits for the individual HARQ feedback exceeds a maximum payload size of the single uplink channel transmission. In some cases, including bundled HARQ feedback in the single uplink channel transmission results in a number of HARQ feedback bits included in the single uplink channel transmission being less than a maximum payload size of the single uplink channel transmission. In some cases, the indication is received in an RRC message or a DCI message. In some cases, including bundled HARQ feedback for the set of codewords comprises including a single ACK or NACK for the set of codewords. HARQ manager 630 may then transmit the HARQ feedback for the set of codewords in the single uplink channel based on the determination.

In some cases, bundling manager 635 may determine to include in the single uplink channel transmission bundled HARQ feedback for the set of codewords, and HARQ manager 630 may transmit the bundled HARQ feedback for the set of codewords in the single uplink channel to the base station. In some cases, HARQ manager 630 may determine to include in the single uplink channel transmission individual HARQ feedback for each of the set of codewords while facilitating use of side information for decoding of the HARQ feedback, where the individual HARQ feedback includes HARQ feedback for at least one unscheduled transmission in the respective transmission time intervals, and HARQ manager 630 may transmit the individual HARQ feedback for each of the set of codewords in the single uplink channel to the base station.

Transmitter 620 may transmit signals generated by other components of the device. In some examples, the transmitter 620 may be collocated with a receiver 610 in a transceiver module. For example, the transmitter 620 may be an example of aspects of the transceiver 735 described with reference to FIG. 7. The transmitter 620 may utilize a single antenna or a set of antennas.

Figure 7:
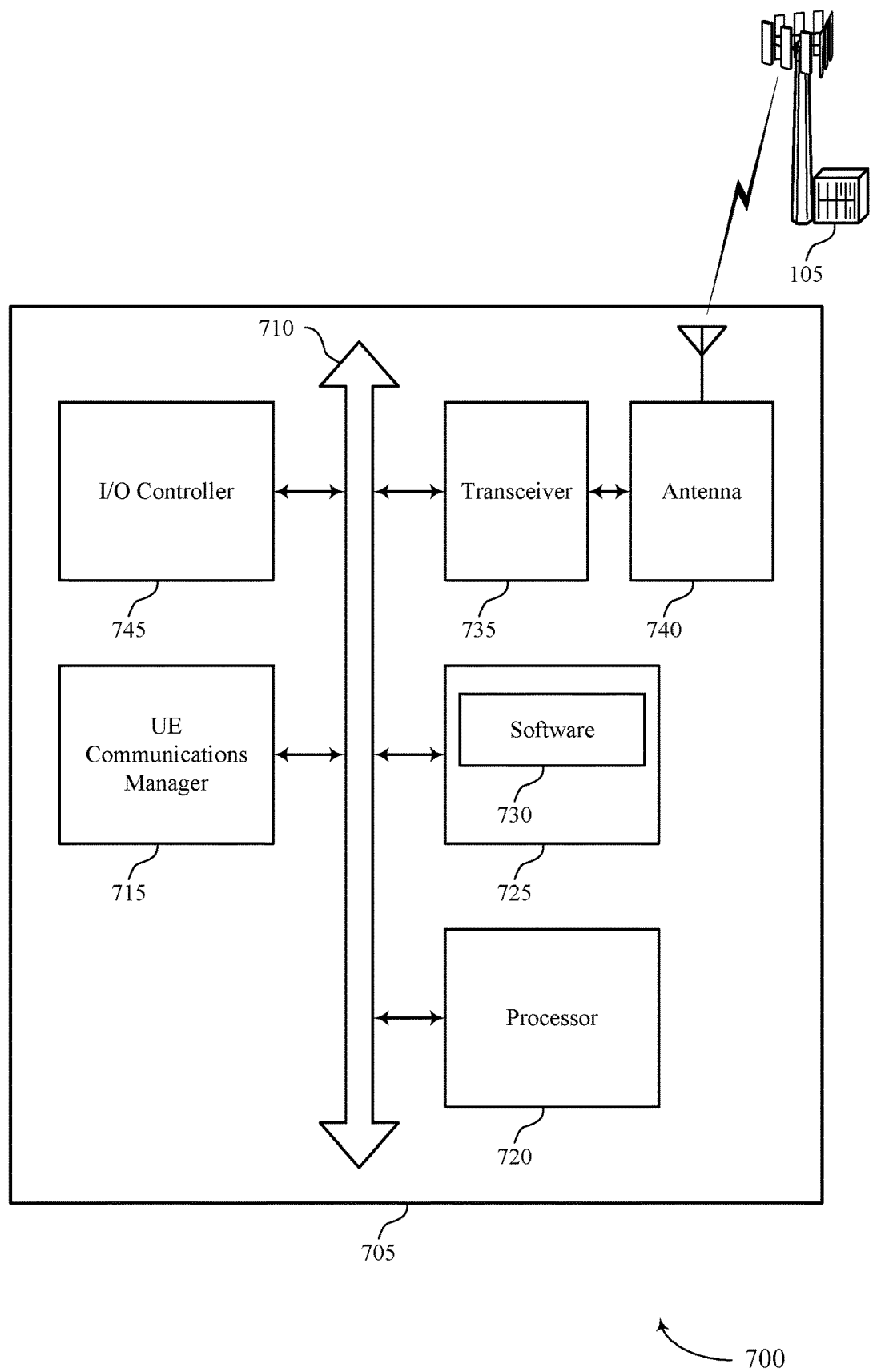
FIG. 7 illustrates a block diagram of a system including a user equipment (UE) that supports HARQ feedback in a physical uplink channel in accordance with aspects of the present disclosure.

FIG. 7 shows a diagram of a system 700 including a device 705 that supports HARQ feedback in a physical uplink channel in accordance with aspects of the present disclosure. Device 705 may be an example of or include the components of wireless device 505, wireless device 605, or a UE 115 as described above, e.g., with reference to FIGS. 5 and 6. Device 705 may include components for bi-directional voice and data communications including components for transmitting and receiving communications, including UE communications manager 715, processor 720, memory 725, software 730, transceiver 735, antenna 740, and I/O controller 745. These components may be in electronic communication via one or more buses (e.g., bus 710). Device 705 may communicate wirelessly with one or more base stations 105.

Processor 720 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting HARQ feedback in a physical uplink channel).

Memory 725 may include random access memory (RAM) and read only memory (ROM). The memory 725 may store computer-readable, computer-executable software 730 including instructions that, when executed, cause the processor to perform various functions described herein. In some cases, the memory 725 may contain, among other things, a basic input/output system (BIOS) which may control basic hardware or software operation such as the interaction with peripheral components or devices.

Software 730 may include code to implement aspects of the present disclosure, including code to support HARQ feedback in a physical uplink channel. Software 730 may be stored in a non-transitory computer-readable medium such as system memory or other memory. In some cases, the software 730 may not be directly executable by the processor but may cause a computer (e.g., when compiled and executed) to perform functions described herein.

Transceiver 735 may communicate bi-directionally, via one or more antennas, wired, or wireless links as described above. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas.

In some cases, the wireless device may include a single antenna 740. However, in some cases the device may have more than one antenna 740, which may be capable of concurrently transmitting or receiving multiple wireless transmissions.

I/O controller 745 may manage input and output signals for device 705. I/O controller 745 may also manage peripherals not integrated into device 705. In some cases, I/O controller 745 may represent a physical connection or port to an external peripheral. In some cases, I/O controller 745 may utilize an operating system such as iOS®, ANDROID®, MS-DOS®, MS-WINDOWS®, OS/2®, UNIX®, LINUX®, or another known operating system. In other cases, I/O controller 745 may represent or interact with a modem, a keyboard, a mouse, a touchscreen, or a similar device. In some cases, I/O controller 745 may be implemented as part of a processor. In some cases, a user may interact with device 705 via I/O controller 745 or via hardware components controlled by I/O controller 745.

Figure 8:
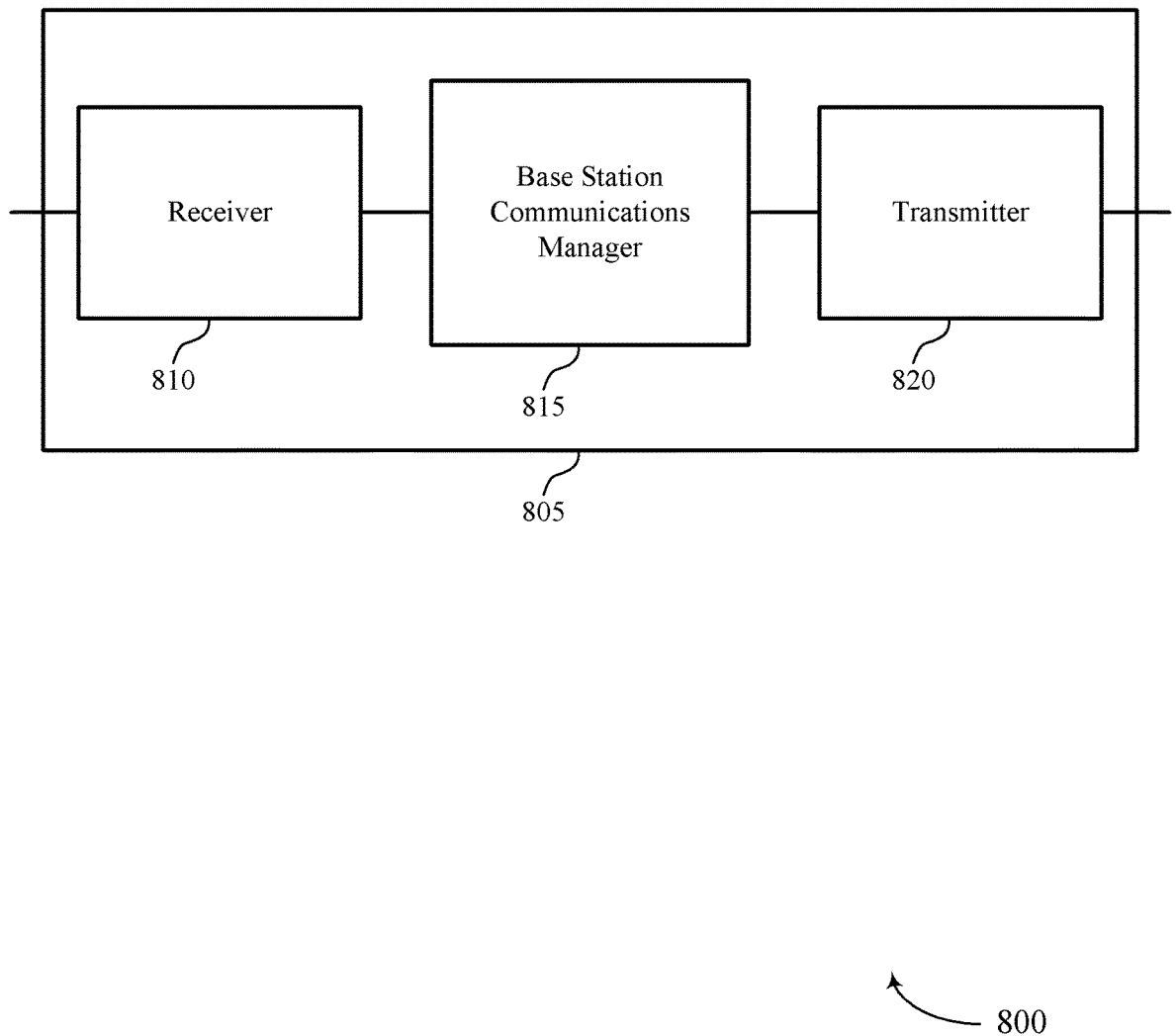
FIGS. 8 and 9 show block diagrams of a device that supports HARQ feedback in a physical uplink channel in accordance with aspects of the present disclosure.

FIG. 8 shows a block diagram 800 of a wireless device 805 that supports HARQ feedback in a physical uplink channel in accordance with aspects of the present disclosure. Wireless device 805 may be an example of aspects of a base station 105 as described herein. Wireless device 805 may include receiver 810, base station communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to HARQ feedback in a physical uplink channel, etc.). Information may be passed on to other components of the device. The receiver 810 may be an example of aspects of the transceiver 1035 described with reference to FIG. 10. The receiver 810 may utilize a single antenna or a set of antennas.

Base station communications manager 815 may be an example of aspects of the base station communications manager 1015 described with reference to FIG. 10. Base station communications manager 815 and/or at least some of its various sub-components may be implemented in hardware, software executed by a processor, firmware, or any combination thereof. If implemented in software executed by a processor, the functions of the base station communications manager 815 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 815 and/or at least some of its various sub-components may be physically located at various positions, including being distributed such that portions of functions are implemented at different physical locations by one or more physical devices. In some examples, base station communications manager 815 and/or at least some of its various sub-components may be a separate and distinct component in accordance with various aspects of the present disclosure. In other examples, base station communications manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 815 may establish a connection with a UE, determine whether to configure the UE to include individual HARQ feedback for each codeword received from the base station or to include bundled HARQ feedback for codewords received from the base station, and transmit an indication to the UE of whether to include individual HARQ feedback for each codeword received from the base station or to include bundled HARQ feedback for codewords received from the base station.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
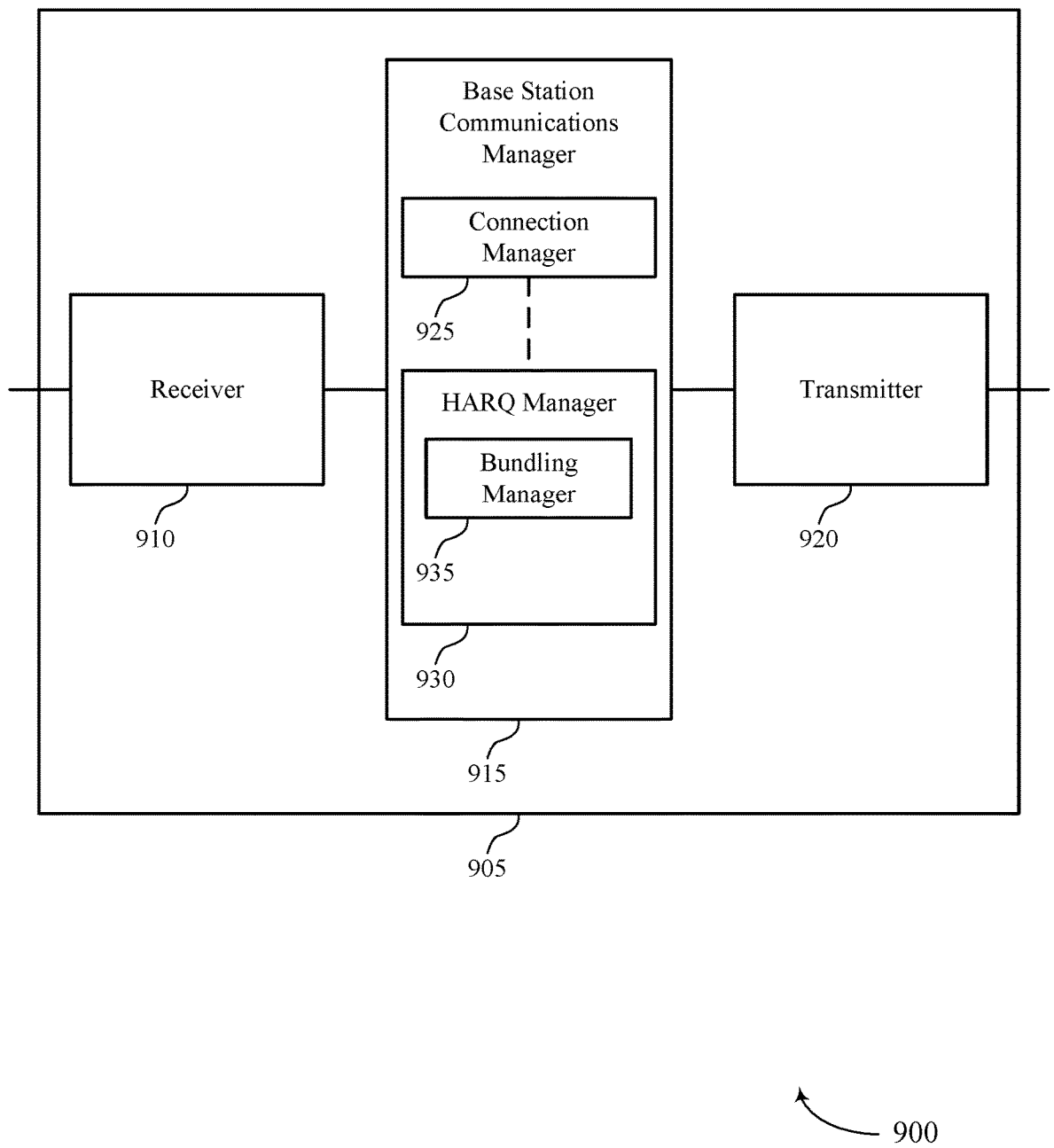

FIG. 9 shows a block diagram 900 of a wireless device 905 that supports HARQ feedback in a physical uplink channel in accordance with aspects of the present disclosure. Wireless device 905 may be an example of aspects of a wireless device 805 or a base station 105 as described with reference to FIG. 8. Wireless device 905 may include receiver 910, base station communications manager 915, and transmitter 920. Base station communications manager 915 may be an example of aspects of the base station communications manager 1015 described with reference to FIG. 10. Base station communications manager 915 may include connection manager 925, HARQ manager 930, and bundling manager 935. Wireless device 905 may also include a processor. Each of these components may be in communication with one another (e.g., via one or more buses).

Receiver 910 may receive information such as packets, user data, or control information associated with various information channels (e.g., control channels, data channels, and information related to HARQ feedback in a physical uplink channel, etc.). Information may be passed on to other components of the device. The receiver 910 may be an example of aspects of the transceiver 1035 described with reference to FIG. 10. The receiver 910 may utilize a single antenna or a set of antennas.

Connection manager 925 may establish a connection with a UE. Bundling manager 935 may determine whether to configure the UE to include individual HARQ feedback for each codeword received from the base station or to include bundled HARQ feedback for codewords received from the base station. In some cases, including bundled HARQ feedback for the codewords comprises including a single ACK or NACK for the codewords. HARQ manager 930 may then transmit an indication to the UE of whether to include individual HARQ feedback for each codeword received from the base station or to include bundled HARQ feedback for codewords received from the base station.

In some cases, the determining of whether to configure the UE to include individual HARQ feedback for each codeword received from the base station while facilitating use of side information for decoding of the HARQ feedback or to include bundled HARQ feedback for codewords received from the base station is based on a quality of the connection with the UE, a traffic type associated with the codewords, a duration of time during which the codewords are transmitted, or a combination thereof. In some cases, the indication configures the UE to include bundled HARQ feedback for codewords received from the base station. In some cases, the indication configures the UE to include individual HARQ feedback for each codeword received from the base station while facilitating use of side information for decoding of the HARQ feedback. In some cases, the indication is transmitted in an RRC message or a DCI message. In some cases, the indication indicates whether to include individual HARQ feedback or bundled HARQ feedback for codewords that are time-division multiplexed, frequency division multiplexed, spatially multiplexed, or a combination thereof.

Transmitter 920 may transmit signals generated by other components of the device. In some examples, the transmitter 920 may be collocated with a receiver 910 in a transceiver module. For example, the transmitter 920 may be an example of aspects of the transceiver 1035 described with reference to FIG. 10. The transmitter 920 may utilize a single antenna or a set of antennas.

Figure 10:
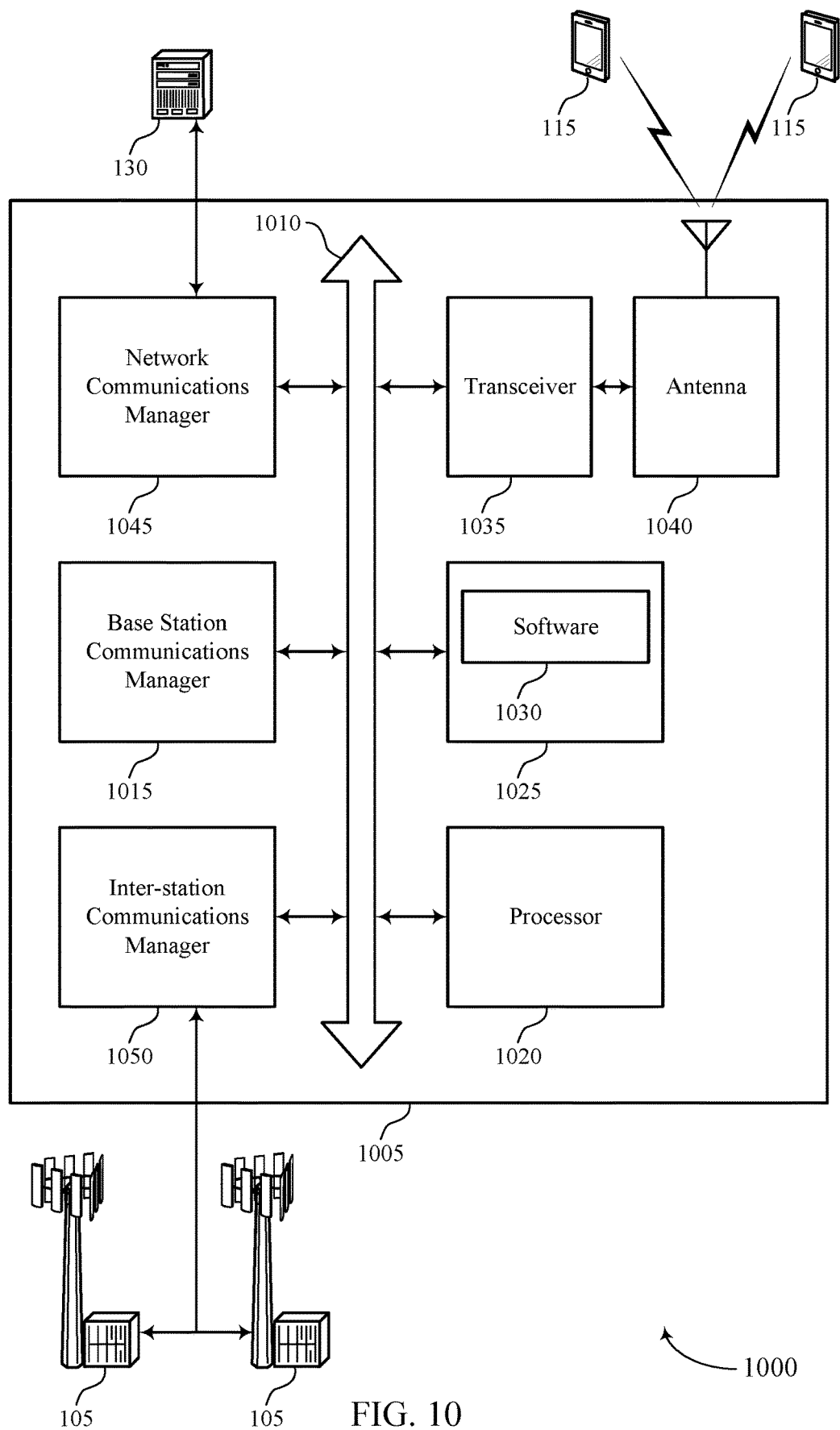
FIG. 10 illustrates a block diagram of a system including a base station that supports HARQ feedback in a physical uplink channel in accordance with aspects of the present disclosure.

FIG. 10 shows a diagram of a system 1000 including a device 1005 that supports HARQ feedback in a physical uplink channel in accordance with aspects of the present disclosure. Device 1005 may be an example of or include the components of base station 105 as described above, e.g., with reference to FIG. 1. Device 1005 may include components for bi-directional voice and data communications including components for transmitting and receiving communications, including base station communications manager 1015, processor 1020, memory 1025, software 1030, transceiver 1035, antenna 1040, network communications manager 1045, and inter-station communications manager

1050. These components may be in electronic communication via one or more buses (e.g., bus 1010). Device 1005 may communicate wirelessly with one or more UEs 115.

Processor 1020 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting HARQ feedback in a physical uplink channel).

Memory 1025 may include RAM and ROM. The memory 1025 may store computer-readable, computer-executable software 1030 including instructions that, when executed, cause the processor to perform various functions described herein. In some cases, the memory 1025 may contain, among other things, a BIOS which may control basic hardware or software operation such as the interaction with peripheral components or devices.

Software 1030 may include code to implement aspects of the present disclosure, including code to support HARQ feedback in a physical uplink channel. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

Network communications manager 1045 may manage communications with the core network (e.g., via one or more wired backhaul links). For example, the network communications manager 1045 may manage the transfer of data communications for client devices, such as one or more UEs 115.

Inter-station communications manager 1050 may manage communications with other base station 105 and may include a controller or scheduler for controlling communications with UEs 115 in cooperation with other base stations 105. For example, the inter-station communications manager 1050 may coordinate scheduling for transmissions to UEs 115 for various interference mitigation techniques such as beamforming or joint transmission. In some examples, inter-station communications manager 1050 may provide an X2 interface within an LTE/LTE-A wireless communication network technology to provide communication between base stations 105.

Figure 11:
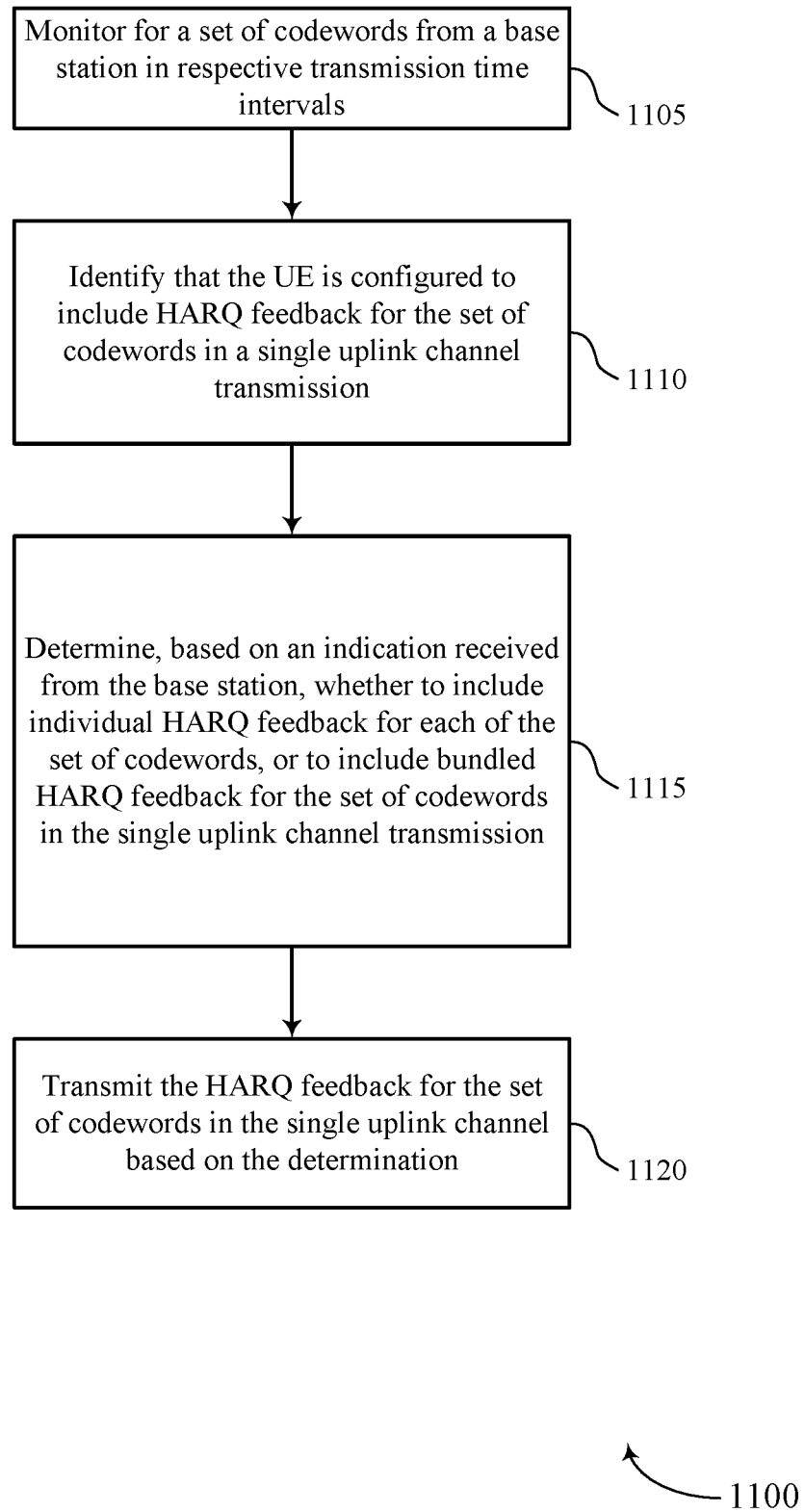
FIGS. 11 and 12 illustrate methods for HARQ feedback in a physical uplink channel in accordance with aspects of the present disclosure.

FIG. 11 shows a flowchart illustrating a method 1100 for HARQ feedback in a physical uplink channel in accordance with aspects of the present disclosure. The operations of method 1100 may be implemented by a UE 115 or its components as described herein. For example, the operations of method 1100 may be performed by a UE communications manager as described with reference to FIGS. 5 through 7. In some examples, a UE 115 may execute a set of codes to control the functional elements of the device to perform the functions described below. Additionally, or alternatively, the UE 115 may perform aspects of the functions described below using special-purpose hardware.

At 1105 the UE 115 may monitor for a plurality of codewords from a base station in respective transmission time intervals. The operations of 1105 may be performed according to the methods described herein. In certain examples, aspects of the operations of 1105 may be performed by a codeword manager as described with reference to FIGS. 5 through 7.

At 1110 the UE 115 may identify that the UE is configured to include HARQ feedback for the plurality of codewords in a single uplink channel transmission. The operations of 1110 may be performed according to the methods described herein. In certain examples, aspects of the operations of 1110 may be performed by a HARQ manager as described with reference to FIGS. 5 through 7.

At 1115 the UE 115 may determine, based at least in part on an indication received from the base station, whether to include individual HARQ feedback for each of the plurality of codewords, or to include bundled HARQ feedback for the plurality of codewords in the single uplink channel transmission. The operations of 1115 may be performed according to the methods described herein. In certain examples, aspects of the operations of 1115 may be performed by a bundling manager as described with reference to FIGS. 5 through 7.

At 1120 the UE 115 may transmit the HARQ feedback for the plurality of codewords in the single uplink channel based at least in part on the determination. The operations of 1120 may be performed according to the methods described herein. In certain examples, aspects of the operations of 1120 may be performed by a HARQ manager as described with reference to FIGS. 5 through 7.

Figure 12:
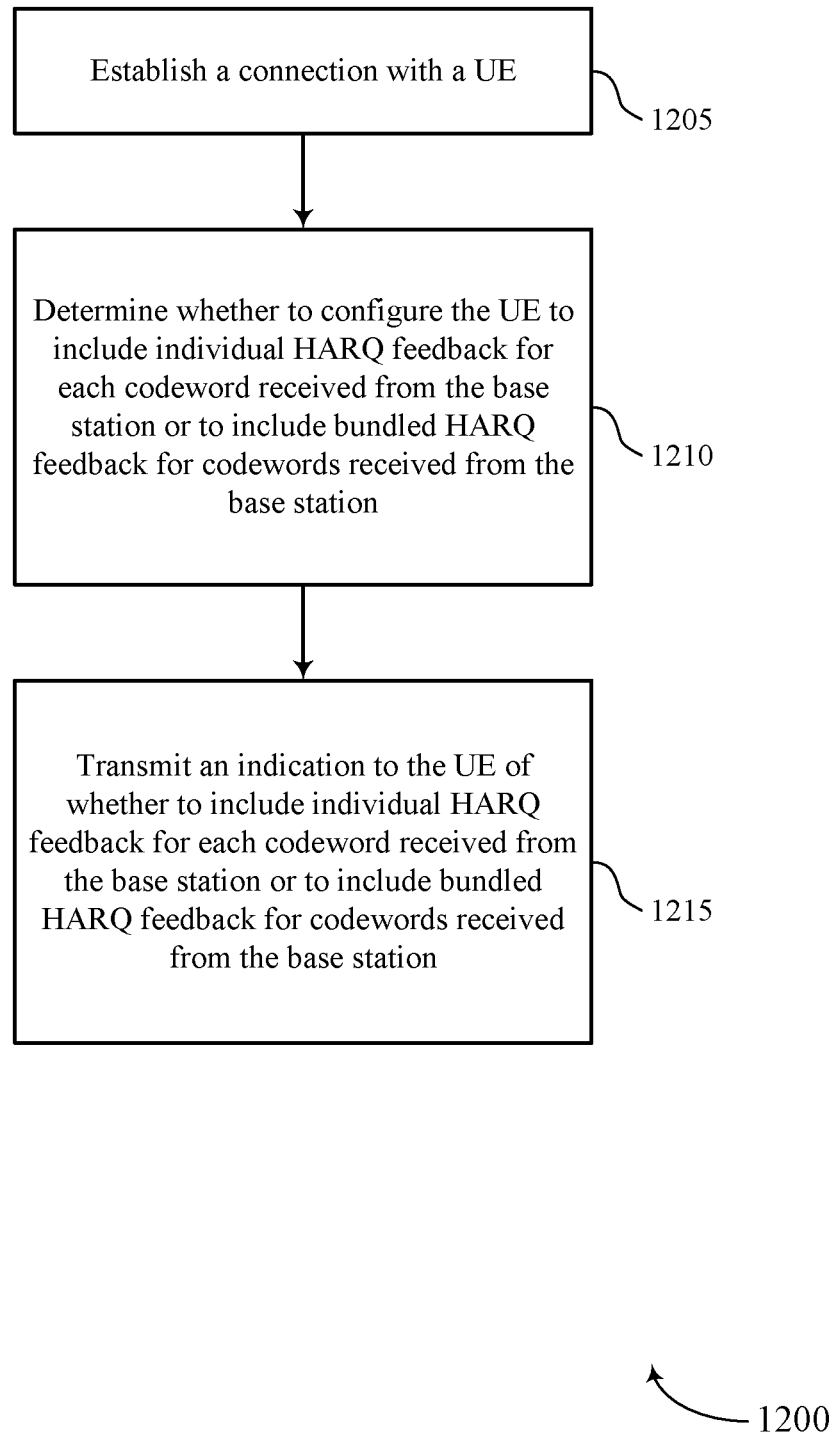

FIG. 12 shows a flowchart illustrating a method 1200 for HARQ feedback in a physical uplink channel in accordance with aspects of the present disclosure. The operations of method 1200 may be implemented by a base station 105 or its components as described herein. For example, the operations of method 1200 may be performed by a base station communications manager as described with reference to FIGS. 8 through 10. In some examples, a base station 105 may execute a set of codes to control the functional elements of the device to perform the functions described below. Additionally, or alternatively, the base station 105 may perform aspects of the functions described below using special-purpose hardware.

At 1205 the base station 105 may establish a connection with a user equipment (UE). The operations of 1205 may be performed according to the methods described herein. In certain examples, aspects of the operations of 1205 may be performed by a connection manager as described with reference to FIGS. 8 through 10.

At 1210 the base station 105 may determine whether to configure the UE to include individual HARQ feedback for each codeword received from the base station or to include bundled HARQ feedback for codewords received from the base station. The operations of 1210 may be performed according to the methods described herein. In certain examples, aspects of the operations of 1210 may be performed by a bundling manager as described with reference to FIGS. 8 through 10.

At 1215 the base station 105 may transmit an indication to the UE of whether to include individual HARQ feedback for each codeword received from the base station or to include bundled HARQ feedback for codewords received from the base station. The operations of 1215 may be performed according to the methods described herein. In certain examples, aspects of the operations of 1215 may be performed by a HARQ manager as described with reference to FIGS. 8 through 10.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   monitoring for a plurality of codewords from a base station in corresponding downlink data channel transmissions associated with hybrid automatic repeat request (HARQ) feedback reporting in a single uplink channel transmission;
   determining, based at least in part on an indication received from the base station, whether to include individual HARQ feedback for each of the plurality of codewords, or to include bundled HARQ feedback for the plurality of codewords in the single uplink channel transmission, wherein when it is determined to include individual HARQ feedback for each of the plurality of codewords, the UE includes side information comprising HARQ feedback for unscheduled downlink data channel transmissions associated with the HARQ feedback reporting; and
   transmitting the HARQ feedback for the plurality of codewords in the single uplink channel based at least in part on the determination.

2. The method of claim 1, wherein determining whether to include individual HARQ feedback or bundled HARQ feedback is independent of whether a number of bits for the individual HARQ feedback exceeds a maximum payload size of the single uplink channel transmission.

3. The method of claim 1, wherein including bundled HARQ feedback in the single uplink channel transmission results in a number of HARQ feedback bits included in the single uplink channel transmission being less than a maximum payload size of the single uplink channel transmission.

4. The method of claim 1, wherein the indication is received in a radio resource control (RRC) message or a downlink control information (DCI) message.

5. The method of claim 1, further comprising:
   determining to include in the single uplink channel transmission bundled HARQ feedback for the plurality of codewords; and
   transmitting the bundled HARQ feedback for the plurality of codewords in the single uplink channel to the base station.

6. The method of claim 1, wherein transmitting the HARQ feedback for the plurality of codewords in the single uplink channel comprises:
   transmitting the individual HARQ feedback for each of the plurality of codewords in the single uplink channel to the base station.

7. The method of claim 1, wherein including bundled HARQ feedback for the plurality of codewords comprises including a single acknowledgment (ACK) or negative acknowledgment (NACK) for the plurality of codewords.

8. The method of claim 1, wherein the plurality of codewords are time-division multiplexed, frequency division multiplexed, spatially multiplexed, or a combination thereof.

9. The method of claim 1, wherein the single uplink channel comprises a physical uplink control channel (PUCCH), a shortened PUCCH (sPUCCH), a physical uplink shared channel (PUSCH), or a shortened PUSCH (sPUSCH).

10. The method of claim 1, wherein monitoring for the plurality of codewords comprises:
    monitoring a plurality of short physical downlink shared channels (sPDSCHs) for the plurality of codewords.

11. A method for wireless communication at a base station, comprising:
    establishing a connection with a user equipment (UE);
    determining whether to configure the UE to include individual hybrid automatic repeat request (HARQ) feedback for each codeword or to include bundled HARQ feedback for codewords received from the base station in downlink data channel transmissions associated with HARQ feedback reporting in a single uplink channel transmission, wherein when the UE is configured to include individual HARQ feedback for each codeword the HARQ feedback includes side information comprising HARQ feedback for unscheduled downlink data channel transmissions associated with the HARQ feedback reporting; and transmitting an indication to the UE of whether to include individual HARQ feedback for each codeword or to include bundled HARQ feedback for codewords received from the base station.

12. The method of claim 11, wherein the determining whether to configure the UE to include individual HARQ feedback for each codeword or to include bundled HARQ feedback is based at least in part on a quality of the connection with the UE, a traffic type associated with the codewords, a duration of time during which the codewords are transmitted, or a combination thereof.

13. The method of claim 11, wherein the indication configures the UE to include bundled HARQ feedback for codewords received from the base station.

14. The method of claim 11, wherein the indication configures the UE to include individual HARQ feedback for each codeword received from the base station.

15. The method of claim 11, wherein the indication is transmitted in a radio resource control (RRC) message or a downlink control information (DCI) message.

16. The method of claim 11, wherein the bundled HARQ feedback for the codewords comprises spatial bundling.

17. The method of claim 11, wherein the indication indicates whether to include individual HARQ feedback or bundled HARQ feedback for codewords that are time-division multiplexed, frequency division multiplexed, spatially multiplexed, or a combination thereof.

18. An apparatus for wireless communication at a user equipment (UE), comprising:
 a processor;
 memory coupled with the processor; and
 instructions stored in the memory and executable by the processor to cause the apparatus to:
 monitor for a plurality of codewords from a base station in corresponding downlink data channel transmissions associated with hybrid automatic repeat request (HARQ) feedback reporting in a single uplink channel transmission;
 determine, based at least in part on an indication received from the base station, whether to include individual HARQ feedback for each of the plurality of codewords, or to include bundled HARQ feedback for the plurality of codewords in the single uplink channel transmission, wherein when it is determined to include individual HARQ feedback for each of the plurality of codewords, the UE includes side information comprising HARQ feedback for unscheduled downlink data channel transmissions associated with the HARQ feedback reporting; and
 transmit the HARQ feedback for the plurality of codewords in the single uplink channel based at least in part on the determination.

19. The apparatus of claim 18, wherein the indication is received in a radio resource control (RRC) message or a downlink control information (DCI) message.

20. The apparatus of claim 18, wherein the instructions are further executable by the processor to cause the apparatus to:

determine to include in the single uplink channel transmission bundled HARQ feedback for the plurality of codewords; and
transmit the bundled HARQ feedback for the plurality of codewords in the single uplink channel transmission to the base station.

21. The apparatus of claim 18, wherein the instructions are further executable by the processor to cause the apparatus to:
 determine to include in the single uplink channel transmission individual HARQ feedback for each of the plurality of codewords; and
 transmit the individual HARQ feedback for each of the plurality of codewords in the single uplink channel transmission to the base station.

22. The apparatus of claim 18, wherein the bundled HARQ feedback for the plurality of codewords comprises spatial bundling.

23. The apparatus of claim 18, wherein the plurality of codewords are time-division multiplexed, frequency division multiplexed, spatially multiplexed, or a combination thereof.

24. The apparatus of claim 18, wherein the single uplink channel comprises a physical uplink control channel (PUCCH), a shortened PUCCH (sPUCCH), a physical uplink shared channel (PUSCH), or a shortened PUSCH (sPUSCH).

25. The apparatus of claim 18, wherein the instructions to monitor for the plurality of codewords are further executable by the processor to cause the apparatus to:
 monitor a plurality of short physical downlink shared channels (sPDSCHs) for the plurality of codewords.

26. An apparatus for wireless communication at a base station, comprising:
 a processor;
 memory coupled with the processor; and
 instructions stored in the memory and executable by the processor to cause the apparatus to:
 establish a connection with a user equipment (UE);
 determine whether to configure the UE to include individual hybrid automatic repeat request (HARQ) feedback for each codeword or to include bundled HARQ feedback for codewords received from the base station in downlink data channel transmissions associated with HARQ feedback reporting in a single uplink channel transmission, wherein when the UE is configured to include individual HARQ feedback for each codeword the HARQ feedback includes side information comprising HARQ feedback for unscheduled downlink data channel transmissions associated with the HARQ feedback reporting; and
 transmit an indication to the UE of whether to include individual HARQ feedback for each codeword or to include bundled HARQ feedback for codewords received from the base station.

27. The apparatus of claim 26, wherein the determining whether to configure the UE to include individual HARQ feedback for each codeword or to include bundled HARQ feedback is based at least in part on a quality of the connection with the UE, a traffic type associated with the codewords, a duration of time during which the codewords are transmitted, or a combination thereof.

28. The apparatus of claim 26, wherein the indication configures the UE to include bundled HARQ feedback for codewords received from the base station.

29. The apparatus of claim 26, wherein the indication configures the UE to include individual HARQ feedback for each codeword received from the base station.

30. The apparatus of claim 26, wherein the indication is transmitted in a radio resource control (RRC) message or a downlink control information (DCI) message.

* * * * *